United States Patent
Utsuno et al.

[11] Patent Number: 5,936,452
[45] Date of Patent: *Aug. 10, 1999

[54] DEVICE FOR DETECTING A PLURALITY OF SIGNAL LEVELS INDICATING STOPPING OF A CLOCK SIGNAL

[75] Inventors: Masayuki Utsuno; Masahiro Asano, both of Hyogo; Yoshiki Cho, Tokyo, all of Japan

[73] Assignees: Mitsubishi Electric Semiconductor Software Co., Ltd., Hyogo; Mitsubishi Denki Kabushiki Kaisha, Tokyo, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/735,079

[22] Filed: Oct. 18, 1996

[30] Foreign Application Priority Data

Jun. 3, 1996 [JP] Japan .................................. 8-140094

[51] Int. Cl.$^6$ ..................................................... H03K 3/00
[52] U.S. Cl. .............................. 327/292; 327/20; 327/142
[58] Field of Search .............................. 327/18, 20, 142, 327/292, 198

[56] References Cited

U.S. PATENT DOCUMENTS

| | | | |
|---|---|---|---|
| 4,623,845 | 11/1986 | Ide | 327/160 |
| 5,313,428 | 5/1994 | Inoue | 365/222 |
| 5,357,491 | 10/1994 | Yamasaki | 368/156 |

FOREIGN PATENT DOCUMENTS

| | | |
|---|---|---|
| 0385404 | 9/1990 | European Pat. Off. . |
| 0709775 | 5/1996 | European Pat. Off. . |
| 289140 | 3/1990 | Japan . |
| 4171516 | 6/1992 | Japan . |

*Primary Examiner*—Kenneth B. Wells
*Attorney, Agent, or Firm*—Leydig, Voit & Mayer

[57] ABSTRACT

The oscillation-stop detecting device accurately detects the stopping of a clock signal due to various causes. The voltage detecting circuit detects when a clock signal output from the clock signal oscillator remains at a high, a low or an intermediate level, and outputs a clock voltage detection signal. The oscillation-stop detecting circuit outputs a detection signal in response to the voltage detection signal.

13 Claims, 10 Drawing Sheets

(a) SIGNAL301
(b) SIGNAL101
(c) SIGNAL102
(d) SIGNAL103
(e) SIGNAL110

(a) SIGNAL301
(b) SIGNAL101
(c) SIGNAL102
(d) SIGNAL103
(e) SIGNAL110

(a) SIGNAL301
(b) SIGNAL101
(c) SIGNAL102
(d) SIGNAL103
(e) SIGNAL110

(a) Vdd
(b) SIGNAL301
(c) SIGNAL305
(d) SIGNAL302
(e) SIGNAL307
(f) SIGNAL303

DEVICE FOR DETECTING A PLURALITY OF SIGNAL LEVELS INDICATING STOPPING OF A CLOCK SIGNAL

BACKGROUND OF THE INVENTION

1. Field of the Invention

This invention relates to an oscillation-stop detecting device for detecting when a clock signal source does not oscillate normally in a semiconductor device using an s clock signal, such as a microcomputer.

2. Description of the Prior Art

FIG. 13 is a circuit diagram showing a structure of an conventional oscillation-stop detecting device disclosed in JP-A 4/171516. For example, this oscillation-stop detecting device can be adapted to a microcomputer. In FIG. 13, numeral 210 indicates a clock signal oscillator including a inverter 216 and a resistor Rf and functioning with an oscillator 219 connected to an input terminal 212 and output terminal 214 so as to output a clock signal 301; 220 indicates an oscillation-stop detecting section outputting a detection signal 302 of low level when the clock signal 301 stops; 230 indicates a CPU receiving the clock signal 301 and an active-high reset signal 303; 240 indicates a reset signal generator generating a reset signal 305 based on a voltage by a resistor and a capacitor which are connected to a reset signal input terminal 242; and 250 indicates a reset signal controlling section generating the reset signal 303 for the CPU 230 based on the reset signal 305 and the detection signal 302 and providing an initializing signal 307 for the oscillation-stop detecting section.

Next, the operation is described referring to a timing chart shown in FIG. 14.

When the power is turned on for a microcomputer circuit, a reset signal generator 240 generates the reset signal 305, which is kept low for a predetermined period (see FIG. 14(a)). In the reset signal controlling section 250, the reset signal 305 is output through a NAND circuit to the CPU 230 as the signal 303, which is kept high for a predetermined period. At the time, clock signal oscillator 210 generates the clock signal 301 and outputs clock signal 301 to the CPU 230. Since the reset signal 305 becomes high after a predetermined period has passed, the reset sinal 303 for the CPU 230 becomes low and the CPU 230 starts.

In case the voltage level Vdd of the power source becomes low and the clock signal 301 keeps at a low level continuously (see FIGS. 14(a) and 14(b)), an input level of a Schmitt trigger buffer becomes high because a P-channel transistor is OFF in the oscillation-stop detecting section 220. Consequently, an input level of a clock terminal of a D flip/flop in the oscillation-stop detecting section 220 becomes high and the detection signal 302 becomes a low (see FIG. 14(d)). Since the detection signal 302 passes through a NAND circuit in the reset signal controlling section 250, the reset signal 303 indicating a high level is output to CPU 230 (see FIG. 14(f)). As a result, the CPU 230 is reset.

In case the voltage level Vdd returns to the normal level and the clock signal 301 is outputted again, a high level appears at a Q-output terminal of a D flip/flop in the reset signal controlling section 250. Consequently, because the initializing signal 307 becomes active (see FIG. 14(e)), the D flip/flop in the oscillation-stop detecting section 220 is reset. As a result, because the level of the reset signal 303 returns to low level, it becomes possible for the CPU 230 to function again.

As described above, in case the oscillation-stop detecting section 220 detects the stopping of the clock signal 301, an active reset signal 303 is provided for the CPU 230 to reset the CPU 230.

Error protection mechanisms of the microcomputer include safe processing by software, a watch-dog timer in the microcomputer, peripheral circuits outside the microcomputer and so forth. Generally, peripheral circuits and other error protection mechanisms are constructed according to a condition when the microcomputer is reset. In other words, if the reset condition of the microcomputer is kept, the peripheral circuits recognizes that the microcomputer drops into an error condition, if the reset condition of the microcomputer is kept. According to the structure shown in FIG. 13, since the CPU 230 enters a reset condition when the clock signal 301 stops, the peripheral circuits can recognize that the microcomputer enters an error condition.

However, it is possible for the oscillation-stop detecting device to detect the stopping of the clock signal 301 only when the level of the clock signal 230 is fixed to a low level caused by lowering of the voltage level Vdd or the like. Actually, the clock signal 301 stops based on various causes, for example disconnection or short-circuiting of the input and output terminals 212 or 214, or extraction of the oscillator 219 from input or output terminal 212 or 214.

As shown in FIG. 15, there is also a structure in which an oscillator device 218 is connected to the input terminal 212 and the microcomputer is provided with the clock signal 301 from the outside. In this case, the clock signal 301 stops based on various causes, for example, disconnection or short-circuiting of the input and output terminals 212 or 214, or damage to the oscillator device 218.

Since the conventional oscillation-stop detecting device is constructed as above, it is difficult to accurately detect the stopping of the clock signal 301 by various causes.

SUMMARY OF THE INVENTION

The present invention is achieved to solve the above problems. Therefore, the object of the present invention is to provide an oscillation-stop detecting device which can surely detect stopping of a clock signal by various causes.

The oscillation-stop detecting device of the present invention comprises a voltage detecting circuit detecting that an output level of said clock signal oscillator becomes to be one of high, low and middle level and outputting a voltage detection signal and an oscillation-stop detecting circuit outputting a detection signal which indicates stop of said clock signal in response to the voltage detection signal indicating that the output level of the clock signal oscillator becomes to be one of the levels.

An oscillation-stop detection controlling circuit forbidding the oscillation-stop detecting circuit to function is adaptable to the oscillation-stop detecting device of the present invention.

The oscillation-stop detection controlling circuit forbids the oscillation-stop detecting circuit to function when one of a delayed signal which is made by delaying a reset signal provided for the semiconductor device, a signal which is made by delaying a signal corresponding to clock stop mode for compulsory stopping the clock signal and a signal for compulsory forbidding clock signal-stop detecting function becomes to be active.

A compulsory reset circuit providing a reset signal for internal portions of the semiconductor circuit when the detection signal from the oscillation-stop detecting circuit becomes to be active is adaptable to the oscillation-stop detecting device of the present invention.

A register storing a condition information of the detection signal indicating stop of each clock signal from each clock signal oscillator is adaptable to the oscillation-stop detecting device of the present invention.

DETAILED DESCRIPTION OF THE PREFERRED EMBODIMENTS

Embodiment 1.

Figure 1:
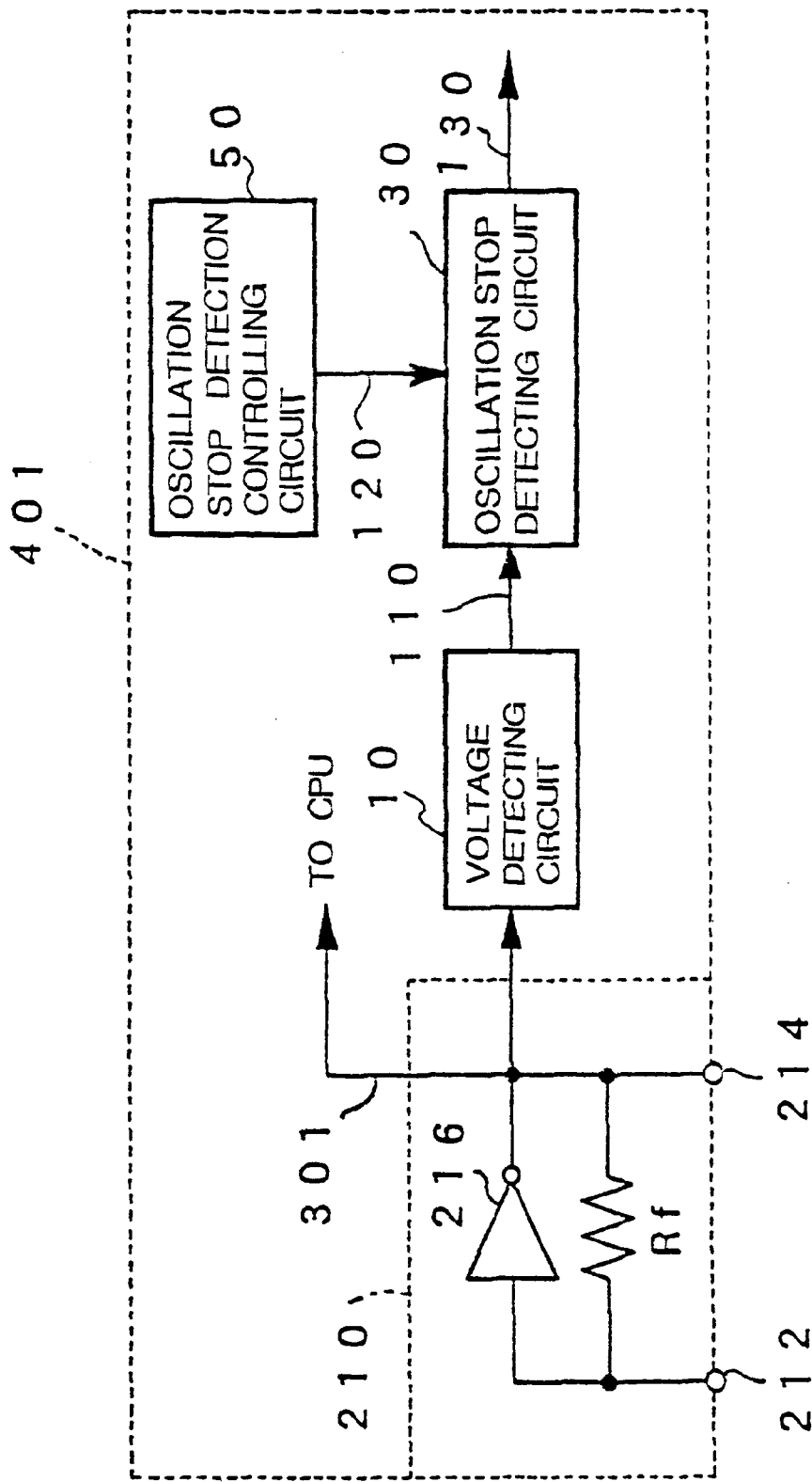
FIG. 1 illustrates a block diagram showing a structure of an oscillation-stop detecting device according to a first embodiment of the present invention.

FIG. 1 is a block diagram showing a structure of a conventional oscillation-stop detecting device of the first embodiment according to the present invention. This oscillation-stop detecting device may be used in a microcomputer 401, for example. In the figure, a reference numeral 10 denotes a voltage detecting circuit for generating a voltage detecting signal 110 when a clock signal 301 stops; a reference numeral 30 denotes an oscillation-stop detecting circuit for detecting the stopping of the clock signal 301 based on the voltage detecting signal 110 and outputting a detecting signal 130; a reference numeral 50 denotes an oscillation-stop detection controlling circuit for applying an enable signal 120 to the oscillation-stop detecting circuit 30; and a reference numeral 210 denotes a clock signal generating section having a resistor Rf and an inverter 216, which operates with an oscillator connected to an input terminal 212 and an output terminal 214 to generate a clock signal 301.

Figure 2:
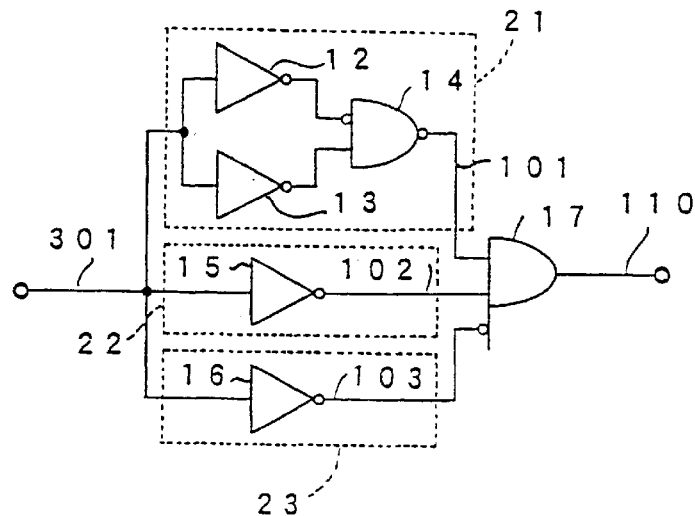
FIG. 2 illustrates a circuit diagram showing a structure of a voltage detecting circuit.

FIG. 2 illustrates a circuit diagram showing one structure of a voltage detecting circuit 10. In the figure, reference numerals 12 and 13 show inverters receiving the clock signal 301; a reference numeral 14 denotes a logical circuit receiving outputs from the inverters 12 and 13 and outputting a first stop detecting signal 101 which indicates an open state between an input and an output terminal; a reference numeral 15 denotes an inverter receiving the clock signal 301 and outputting a second stop detecting signal 102 indicating that the level of the clock signal 301 is fixed to a high level; a reference numeral 16 denotes an inverter receiving the clock signal 301 and outputting a third stop detecting signal 103 indicating that the level of the clock signal 301 is fixed to a low level; and a reference numeral 17 denotes a logical circuit receiving outputs from the inverters 15, 16 and the logical circuit 16 and outputting the voltage detecting signal 110.

A reference numeral 21 denotes a first stop detecting circuit including the inverters 12 and 13 and the logical circuit 14, a reference numeral 22 denotes a second stop detecting circuit including the inverter 15 and a reference numeral 23 denotes a third stop detecting circuit including the inverter 16. Here, the first stop detecting signal 101 and the second stop detecting signal 102 indicate low levels as active levels respectively, and the third stop detecting signal 103 indicates a high level as an active level.

Figure 3:
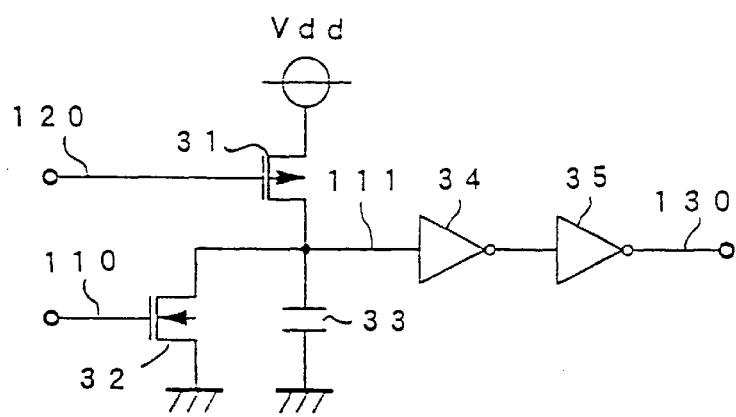
FIG. 3 illustrates a circuit diagram showing a structure of an oscillation stop detecting circuit.

FIG. 3 illustrates a circuit diagram showing one structure of an oscillation-stop detecting circuit 30. In the figure, a reference numeral 31 denotes a P-channel transistor in which an enable signal 120 is introduced to a gate terminal thereof and an electric power voltage having a level Vdd is applied to a drain terminal thereof, a reference numeral 32 denotes an N-channel transistor in which the voltage detecting signal 110 is introduced to a gate terminal thereof and a source terminal is fixed to an ground level Vss (0V), a reference numeral 33 denotes a capacitor in which one end is fixed to the ground level Vss and the other end is connected to the source terminal of the P-channel transistor 31 and to the drain terminal of the N-channel transistor 32, a reference numeral 34 denotes an inverter for inverting a voltage signal 111 appearing at the other end of the capacitor 33, and a reference numeral 35 denotes an inverter for outputting the detecting signal 130 by inverting the output from the inverting circuit 34.

An operation is described with reference to a timing charts of FIG. 4, FIGS. 5(A), 5(B) and 5(C), and FIGS. 6(A), 6(B) and 6(C). Here, the clock signal 301 is presented as a sine wave to account for waveform rounding.

The stopping of the clock signal 301 can be caused by following.

1) The input terminal 212 and the output terminal 214 of the clock signal generating section 210 are opened. At this time, since an input and an output terminal of the inverting circuit 216 are connected through a resistor in the clock signal generating section 210, the output level of the inverting circuit 216 changes to ½ Vdd. Namely, the level of the clock signal 301 changes to ½ Vdd as a fixed level.

2) The input terminal 212 of the clock signal generating section 210 is short-circuited to the ground, or the output terminal 214 is short-circuited to the electric power source.

At this time, the output level of the inverting circuit 216 in the clock signal generating circuit 210 changes to Vdd, which is the electric power source level. Namely, the level of the clock signal 301 changes to Vdd as a fixed level.

3) The input terminal 212 of the clock signal generating section 210 is short-circuited to the electric power source, or the output terminal 214 is short-circuited to ground. At this time, the output level of the inverting circuit 216 in the clock signal generating circuit 210 changes to a ground level Vss. Namely, the level of the clock signal 301 changes to Vss as a fixed level.

Figure 4:
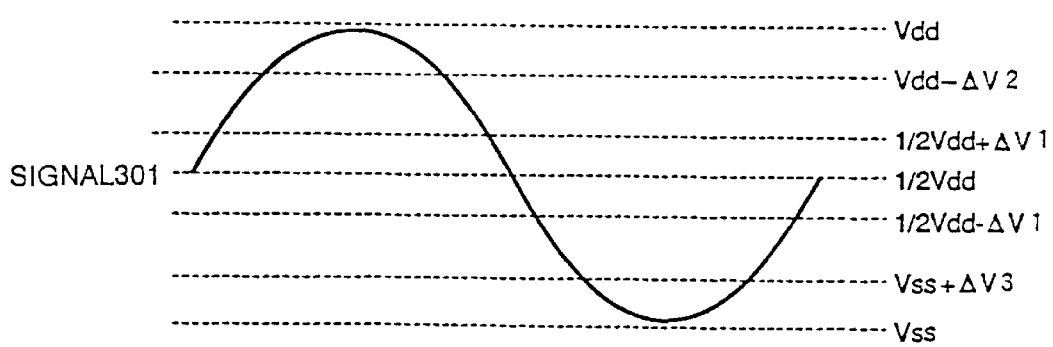
FIG. 4 illustrates a waveform diagram for explaining a threshold value in the voltage detecting circuit.

From above, it is understood that stopping of the clock signal 301 can be detected surely by detecting the change of the clock signal 301 to ½ Vdd, Vdd or Vss as the fixed level. The circuit shown in FIG. 2 is one structure of a detecting circuit in accordance with such ideas. As shown in FIG. 4, threshold values ½ Vdd±ΔV1, Vdd−ΔV2 and Vss+ΔV3 are provided for detecting ½ Vdd, Vdd, or Vss. The values ΔV1, ΔV2 and ΔV3 are minute values which are determined in comparison with the variation of elements.

Figure 5A:
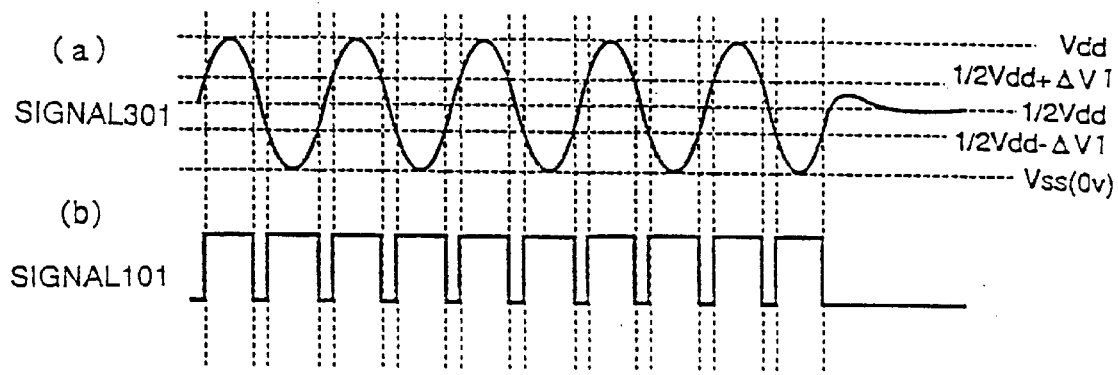
FIGS. 5(A), 5(B) and 5(C) illustrate a timing chart respectively showing a relation between a clock signal and a stop detecting signal in the voltage detecting circuit.

First, a description will be made of how to detect the change of the clock signal 301 into the fixed level of ½ Vdd with reference to FIGS. 5(A) and 6(A). The inverter 12 is designed such that the threshold value is ½ Vdd−ΔV1. The inverter 13 is designed such that the threshold value is the ½ Vdd+ΔV1. Therefore, as shown in (a) of FIG. 5(A) and FIG. 6(A), if the level of the clock signal 301 changes to the fixed level of ½ Vdd, the level of output from the inverter 12 becomes low and the level of the output from the inverter 13 becomes high.

The logical circuit 14 is constructed such that the low level is outputted therefrom if the level of the input which is connected to the output of the inverter 12 becomes low, and the level of the input which is connected to the output of the inverter 13 becomes high. Accordingly, if the level of the clock signal 301 changes to the fixed level of ½ Vdd, the level of the first stop detecting signal 101 which is output from the logical circuit 14 becomes a low level (see (b) of FIG. 5(A), FIG. 6(A)). In other words, the first stop detecting signal 101 indicates an active level.

The inverter 15 is designed such that the threshold value level is Vdd−ΔV2. The inverter 16 is designed such that the threshold value level is Vss+ΔV3. Therefore, if the level of the clock signal 301 changes to the fixed level of ½ Vdd as shown in (c) of FIG. 6(A), the level of the second stop detecting signal 102 which is the output from the inverter 15 becomes high. Namely, the second stop detecting signal 102 does not indicate an active level. In addition, as shown in (d) of FIG. 6(A), the level of the third stop detecting signal 103 which is the output from the inverter 16 becomes low. Namely, the third stop detecting signal 103 does not indicate an active level either.

The logical circuit 17 outputs a high level signal when the first stop detecting signal 101 and the second stop detecting signal 102 indicate a high level, and the third stop detecting signal 103 indicates a low level. Since the active levels of the first stop detecting signal 101 and the second stop detecting signal 102 are low, and the active level of the third stop detecting signal 103 is high, the output of logical circuit 17 becomes low in case that any one of the input signals is active. In other words, the level of the voltage detecting signal 110 becomes low as the active level.

In this case, the level of the voltage detecting signal 110 becomes active on the basis of the first stop detecting signal 101 which is outputted from the logical circuit 14 as shown in (e) of FIG. 6(A).

Figure 6:
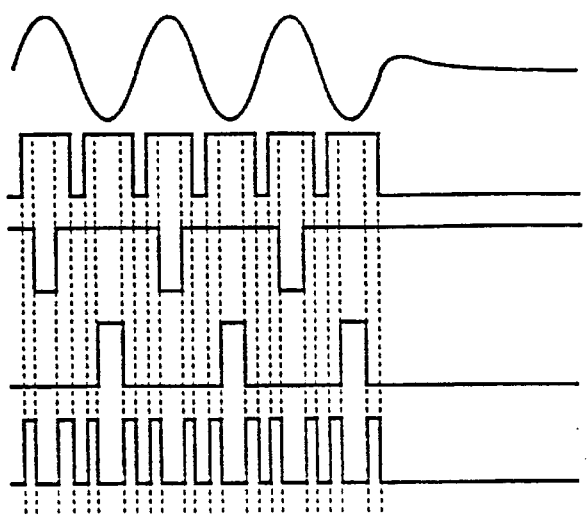
FIGS. 6(A), 6(B) and 6(C) illustrate a timing chart respectively showing a relation among a clock signal, a stop detecting signal in the voltage detecting circuit and a voltage detecting signal from the voltage detecting circuit.
Figure 6:
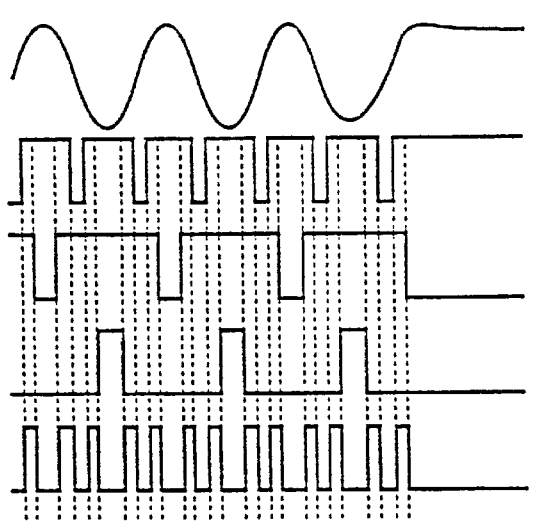
Figure 6:
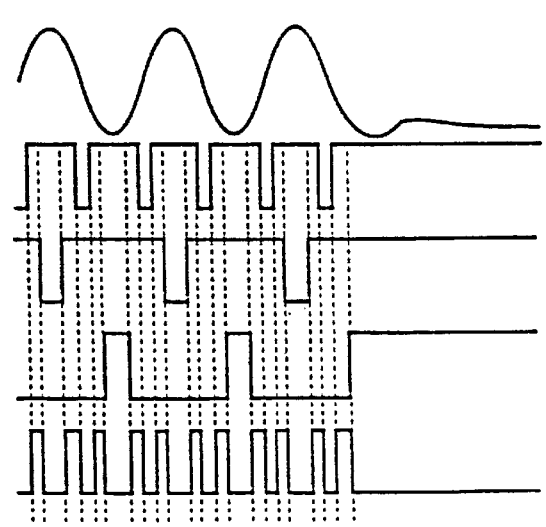

In addition, if the clock signal 301 is outputted continuously, the voltage detecting signal 110 includes pulse signals which are repeatedly generated as shown in the left side of (e) portion of FIG. 6 (A).

Figure 5B:
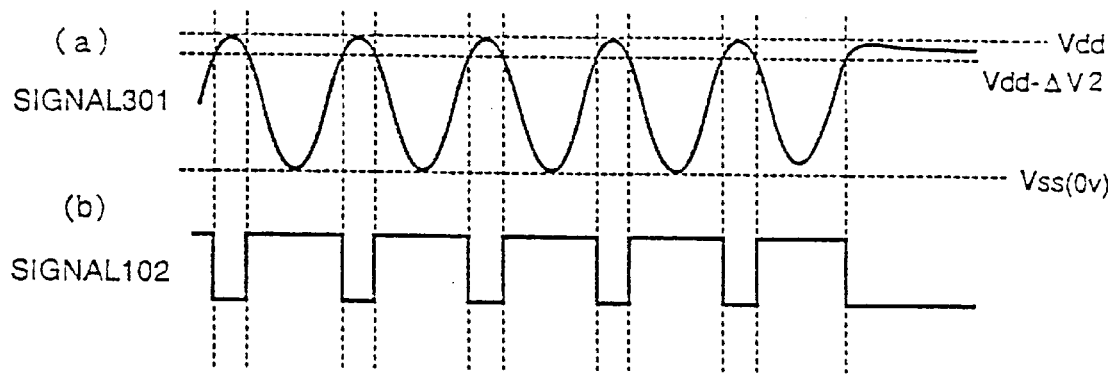

Next, a description will be made how to detect the change of the level of the clock signal 301 to the fixed level of Vdd with reference to FIGS. 5(B) and 6(B). As mentioned above, since the threshold value of the inverter 15 is Vdd−ΔV2, if the level of the clock signal 301 changes to the fixed level of Vdd as shown in (a) of FIG. 5(B) and FIG. 6(B), the level of the second stop detecting signal 102 outputted from the inverter 15 becomes low. Namely, the second stop detecting signal 102 indicates the active level (see (b) of FIG. 5(B) and (c) of FIG. 6(B)). At this time, the level of the first stop detecting signal 101 outputted from the logical circuit 14 is high (see (b) of FIG. 6(B)), and the level of the third stop detecting signal 103 outputted from the inverter 16 is low (see (d) of FIG. 6(B)). Accordingly, in this case, the logical circuit 17 outputs a low level signal on the basis of the second stop detecting signal 102 outputted from the inverter 15. In other words, the voltage detecting signal 110 indicates the active level as shown in (e) portion of FIG. 6(B).

Figure 5C:
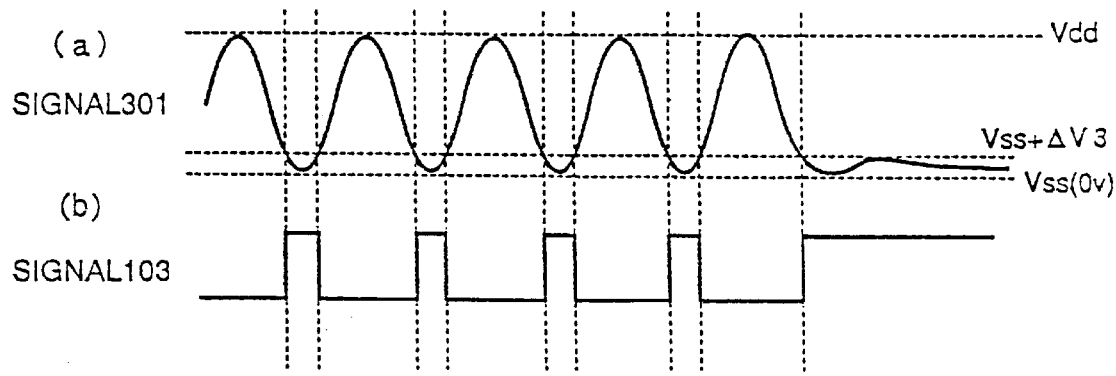

Next, a description will be made of how to detect the change of the level of the clock signal 301 to the fixed level Vss with reference to FIGS. 5(C) and 6(C). As mentioned above, since the threshold value of the inverter 16 is Vss+ΔV3, if the level of the clock signal 301 changes to the fixed level of the Vss as shown in (a) of FIG. 5(C) and FIG. 6(C), the level of the third stop detecting signal 103 outputted from the inverter 16 becomes low. Namely, the third stop detecting signal 103 indicates the active level (see (b) portion of FIG. 5(C) and (d) portion of FIG. 6(C)). At this time, the level of the first stop detecting signal 101 outputted from the logical circuit 14 is high (see (b) of FIG. 6(C)), and the level of the second stop detecting signal 102 outputted from the inverter 15 is high (see (c) portion of FIG. 6(C)). Accordingly, in this case, the logical circuit 17 outputs a low level signal on the basis of the third stop detecting signal 103 outputted from the inverter 15. In other words, the voltage detecting signal 110 indicates the active level as shown in (e) portion of FIG. 6(C).

As mentioned above, when the level of the clock signal 301 changes to the fixed level of ½ Vdd, to Vdd, or to Vss, the first stop detecting signal 101, the second stop detecting signal 102, or the third stop detecting signal 103 outputted from the first stop detecting circuit 21, the second stop detecting circuit 22 or the third stop detecting circuit 23 indicates the active level. As a result, since the logical circuit 17 outputs the low level signal, the voltage detecting circuit 10 outputs the voltage detecting signal 110 indicating the active low level.

Next, an operation of the oscillation-stop detecting circuit 30 will be described with reference to FIG. 3 and the timing chart of FIG. 7. The oscillation-stop detection controlling circuit 50 controls whether or not the operation of the oscillation-stop detecting circuit 30 is permitted. In case that the operation of the oscillation-stop detecting circuit 30 is permitted, the oscillation-stop detection controlling circuit 50 makes the enable signal 120 low so that the enable signal 120 indicates an active level (see (b) of FIG. 7). If the level of the enable signal 120 becomes low, the P-channel transistor 31 is in ON state in the oscillation-stop detecting circuit 30. Therefore, it becomes possible for the capacitor 33 to be charged. In this condition, if the N-channel transistor 32 is in OFF state, the capacitor 33 is charged, and if the N-channel transistor 32 is in ON state, the capacitor 33 is discharged.

Figure 7:
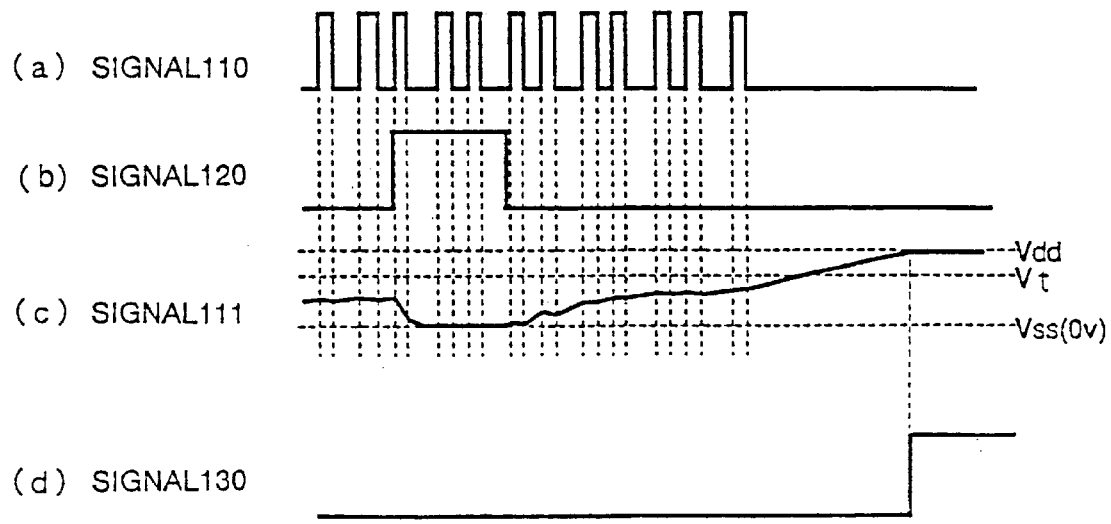
FIG. 7 illustrates a timing chart showing a relation among a voltage detecting signal from the voltage detecting circuit, an enable signal from an oscillation-stop detection controlling circuit and a detecting signal from the oscillation-stop detection controlling circuit.

When the clock signal 301 is outputted continuously, the voltage detecting signal 110 becomes includes pulse signals which are repeatedly generates (see (a) of FIG. 7). In this condition, since the ON state and the OFF state are repeated in the N-channel transistor 32, the capacitor 33 is repeatedly charged and discharged. Therefore, the level of the voltage signal 111 which shows the voltage of the capacitor 33 does not reach the electric power voltage level Vdd (see (c) portion of FIG. 7).

Since the level of the voltage detecting signal 110 from the voltage detecting circuit 10 becomes low if the clock signal 301 stops, the N-channel transistor 32 is maintained in OFF state. Accordingly, the capacitor 33 is charged continuously. Then, the level of the voltage signal 111 rises to the electric power voltage level Vdd at last (see (c) of FIG. 7). The inverter 34 is designed such that the threshold value is Vt which is smaller than the electric power voltage level Vdd. Therefore, the output of the inverter 34 becomes low. Accordingly, the detecting signal 130 indicating the active high level is outputted from the inverter 35 (see (d) portion of FIG. 7).

As mentioned above, if the clock signal 301 stops, the active detecting signal 130 is outputted from the oscillation-stop detecting circuit 30.

Embodiment 2

Figure 8:
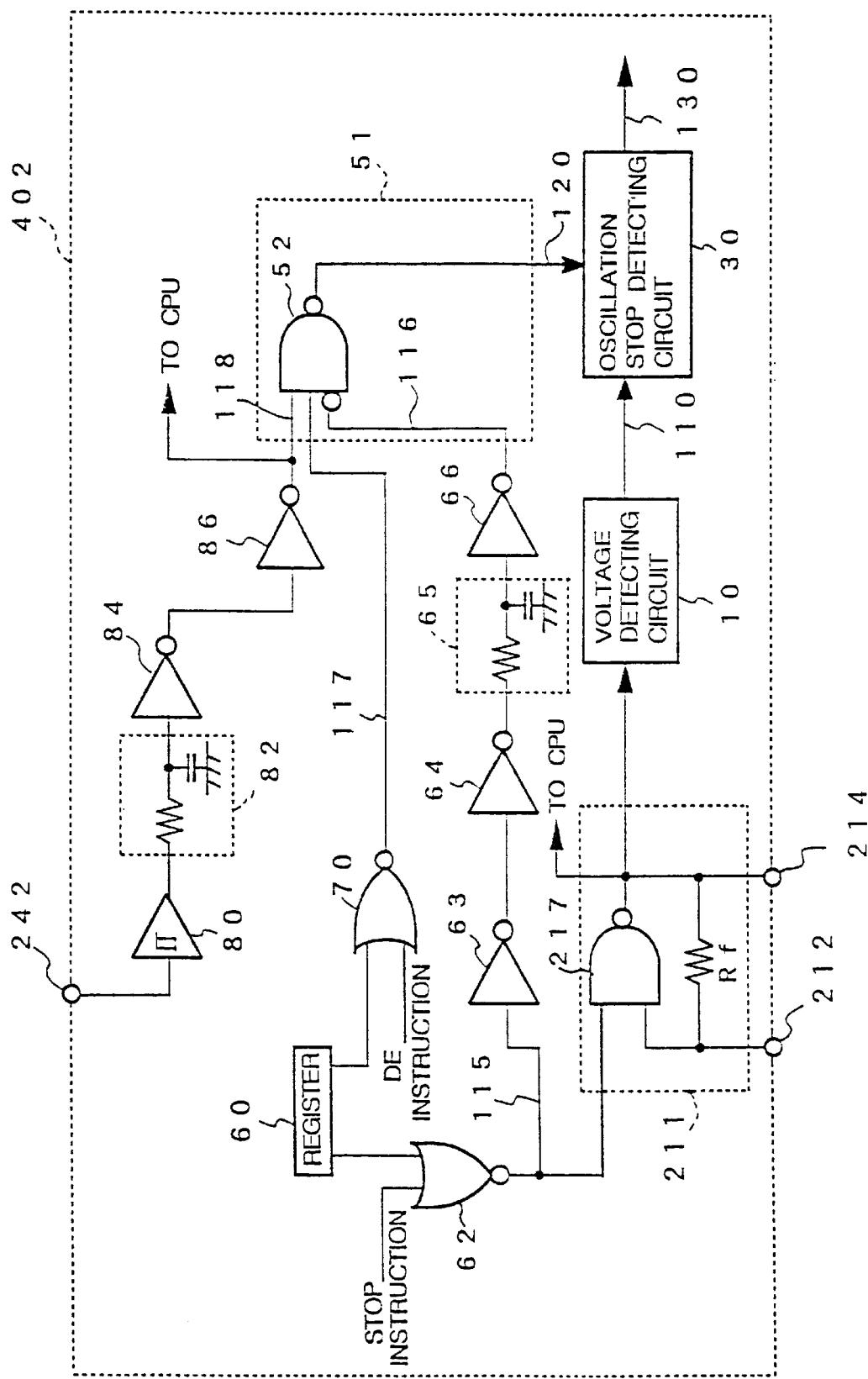
FIG. 8 illustrates a block diagram showing a structure of an oscillation-stop detecting device according to a second embodiment of the present invention.

FIG. 8 illustrates a block diagram showing a structure of an oscillation-stop detecting device according to a second embodiment of the present invention. Here, an oscillation-stop detecting device is shown as adapted to a microcomputer 402. In the figure, a reference numeral 51 denotes an oscillation-stop detection controlling circuit having a logical circuit 52; a reference numeral 60 denotes a control register of the microcomputer 402; a reference numeral 62 denotes an inverting OR circuit (NOR circuit) for NOR-ing a stop mode bit of the control register 60 and a signal corresponding to a STOP instruction from a CPU (not shown) of the microcomputer 402; a reference numeral 63 denotes an inverter for inverting an output signal 115 from the NOR circuit 62; a reference numeral 64 denotes an inverter for inverting an output from the inverter 63; a reference numeral 65 denotes a delay circuit for delaying an output from the inverter 64; and a reference numeral 66 denotes an inverter for inverting an output from the delay circuit 65.

A reference numeral 70 denotes a NOR circuit logical-summing a detection prohibiting bit of the control register 60 and a signal corresponding to a detection prohibiting instruction (DE instruction) from the CPU. A reference numeral 80 denotes a Schmitt trigger circuit for receiving a reset signal from a reset signal input terminal 242; a reference numeral 82 denotes a delay circuit for delaying an output from the Schmitt trigger circuit 80; a reference numeral 84 denotes an inverter for inverting an output from the delay circuit 82; and a reference numeral 86 denotes an inverter for inverting an output from the inverter 84. A reference numeral 211 denotes a clock generating section having a resistor Rf and the NAND circuit 217 which operates with an oscillator connected to an input terminal 212 and an output terminal 214 to generate a clock signal 301. The output from the NOR circuit 62 is connected to one of the inputs of the NAND circuit 217. Other structural elements are the same as shown in FIG. 1.

An operation will be described next.

There is a low consumption mode (stop mode) for stopping the clock signal 301 among operational modes of the microcomputer 402. The low consumption mode starts by executing the STOP instruction which is a specific instruction of the CPU, or by setting the stop mode bit of the control register 60 of the microcomputer 402 by software. When the STOP instruction is executed, or the stop mode bit of the control register 60 is set, since the level of the output from the NOR circuit 62 becomes low, the output from the NAND circuit 217 is not changed. Namely, the clock signal 301 stops. Although the clock signal 301 stops, this condition is not abnormal condition in the low consumption mode. Therefore, in the low consumption mode, the oscillation-stop detection control should not be executed.

The logical circuit 52 receives a first prohibiting signal 116 outputted from the inverter 66, a second prohibiting signal 117 outputted from the NOR circuit 70 and a third prohibiting signal 118 outputted from the inverter 86. The level of the output from the logical circuit 52 becomes low when the first prohibiting signal 116 indicates a low level, and the second prohibiting signal 117 and the third prohibiting signal 118 indicate high levels respectively. In other words, the level of the enable signal 120 outputted from the logical circuit 52 becomes high which shows a detection prohibiting state, when the first prohibiting signal 116 indicates a high level, or the second prohibiting signal 117 or the third prohibiting signal 118 indicates a low level. In addition, the third prohibiting signal 118 operates as an internal reset signal which is applied to the CPU.

Figure 9:
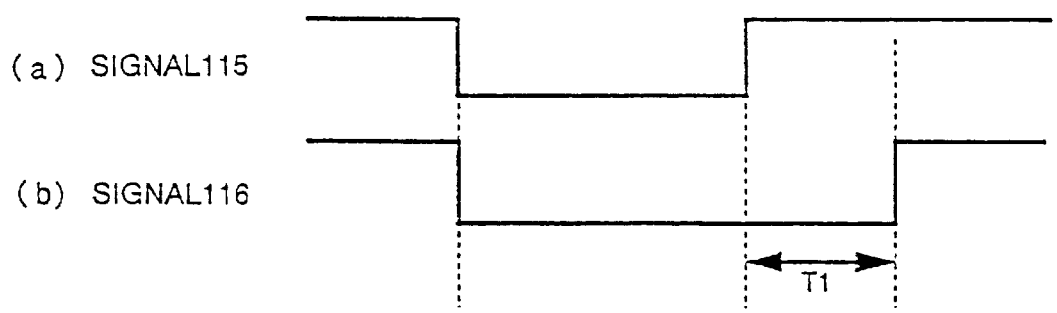
FIG. 9 illustrates a timing chart for explaining an operation of a delay circuit.

In the low consumption mode, since the level of the output signal 115 from the NOR circuit 62 is low, the level of the first prohibiting signal 116 becomes high. Therefore, the level of the enable signal 120 indicates a high level which shows a prohibiting state. The voltage detecting circuit 10 and the oscillation-stop detecting circuit 30 function as functions in the first embodiment. When the level of the enable signal 120 is the high level which shows a detection prohibiting state as shown in FIG. 7, the oscillation-stop detecting circuit 30 enters a no-operating condition. When the mode of the microcomputer 402 changes the low consumption mode into normal mode, the clock signal 301 is outputted again from the clock signal generating section 211. However, when the clock signal is outputted again, it takes a certain time until the frequency of the clock signal 301 is stabilized. Then, there is a possibility that the oscillation-stop detecting circuit 30 outputs the active detecting signal 130 in a period from the release time of the low consumption mode to the time when the frequency of the clock signal 301 is stabilized. Here, the delay circuit 65 for delaying the output signal 115 from the NOR circuit 62 by a time of T1 is utilized. The delay circuit 65 delays the output signal 115 from the NOR circuit 62 for the time T1 as shown in FIG. 9. The time T1 corresponds to a required time until the frequency of the clock signal 301 is stabilized in the clock signal generating section 211. Accordingly, the level of the enable signal 120 is kept to the high level which shows the detection prohibiting state by the delay circuit 65 in the period of T1 from the time when the low consumption mode is canceled. As a result, it becomes to be possible to avoid that the unstable state of the frequency of the clock signal 301 when the low consumption mode is canceled is detected as an abnormal state by mistake.

The frequency of the clock signal 301 outputted from the clock signal generating section 211 is unstable while a certain time after the electric power is applied to the microcomputer 402 at first. Therefore, there is a possibility that the oscillation-stop detecting circuit 30 outputs the active detecting signal 130 by mistake when the electric power of the microcomputer 402 is applied thereto. Accordingly, the operation of the oscillation-stop detecting circuit 30 is prohibited using a reset signal which is used in the microcomputer 402. The reset signal used in the microcomputer 402 is a delayed signal which is an external reset signal delayed by the delay circuit 82, and corresponds to the third prohibiting signal 118.

Figure 10:
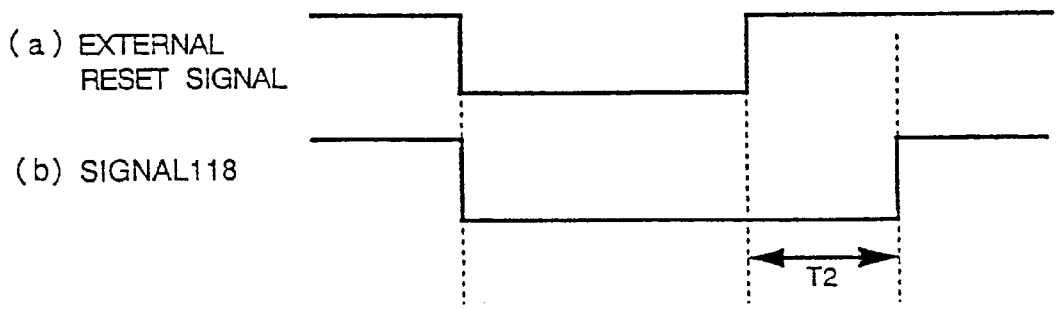
FIG. 10 illustrates a timing chart for explaining an operation of the delay circuit in which a reset signal from outside is delayed.

FIG. 10 is a timing chart for showing a relation between the external reset signal and the third prohibiting signal (internal reset signal) 113. As shown in the figure, the level of the third prohibiting signal 118 becomes high after a T2 period passes from the level of the external reset signal changes into a high level. The T2 period is set to a sufficient time for the frequency to stabilize. While the level of the third prohibiting signal 118 is low, the enable signal 120 indicates a high level which shows the detection prohibiting state. Namely, detecting that the clock signal 301 has stopped by mistake before the frequency of the clock signal 301 is stabilized is prevented.

It is convenient that the operation of the oscillation-stop detecting circuit 30 can be prohibited arbitrarily, not only when the low consumption mode is canceled and the electric power is applied to the microcomputer 402. Here, for instance, the DE instruction is prepared as a specific instruction in the microcomputer 402. In addition, a detection prohibiting bit is assigned on the control register 60. ON/OFF state of the detection prohibiting bit is switched by software. The output level of the NOR circuit 70 becomes low if the DE instruction is executed or the detection prohibiting bit in the control register 60 is set. In other words, the level of second prohibiting signal 117 becomes low. Therefore, the enable signal 120 outputted from the logical circuit 52 indicates a high level which shows the detection prohibiting state.

As mentioned above, the operations of the oscillation-stop detecting circuit 30 are set to the operation prohibiting state by the oscillation-stop detection controlling circuit 51 when the electric power of the microcomputer 402 is applied thereto. Accordingly, detecting that the clock signal 301 as a stopped signal by mistake is prevented. In addition, since the oscillation-stop detecting circuit 30 can be set to the operation prohibiting state by the software, the stop detecting process can be easily stopped when the stop detection of the clock signal 301 is not required in executing a program.

Embodiment 3

Figure 11:
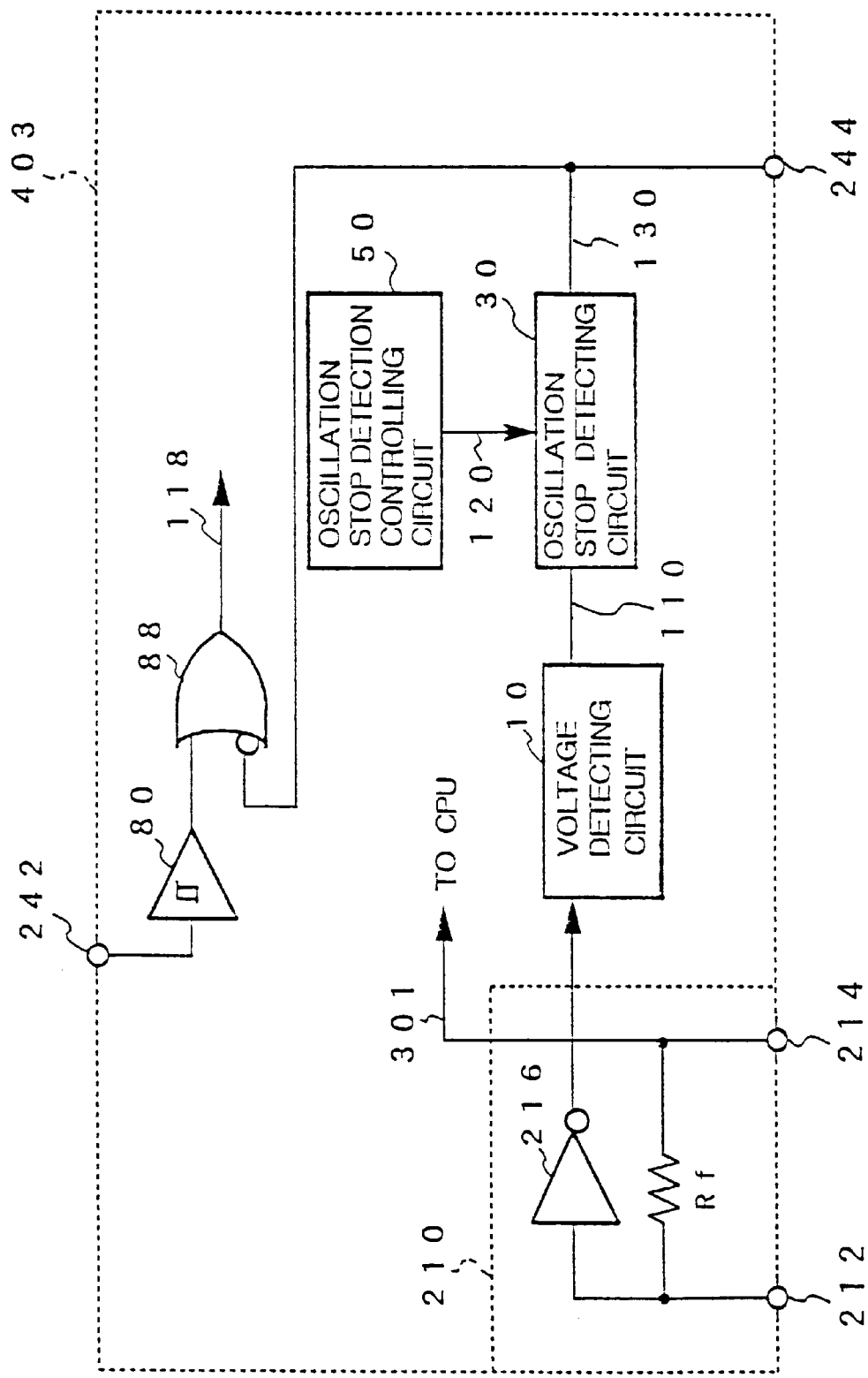
FIG. 11 illustrates a block diagram showing a structure of an oscillation-stop detecting device according to a third embodiment of the present invention.

FIG. 11 illustrates a block diagram showing a structure of an oscillation-stop detecting device according to a third embodiment of the present invention. Here, an oscillation-stop detecting device is shown as adapted to a microcomputer 403. In the figure, a reference numeral 80 denotes a Schmitt trigger circuit receiving a reset signal from a reset signal inputting terminal 242 and a reference numeral 88 denotes a logical circuit (compulsory reset circuit) which a high level signal outputs when the level of the output from the Schmitt trigger circuit 80 is high and the detecting signal 130 indicates a low level. Consequently, the level of the output of the logical circuit 88 indicates the active low level when the level of the output from the Schmitt trigger circuit 80 is low, or the detecting signal 130 indicates a high level which is the active level. The output from the logical circuit 88 becomes an internal reset signal 118. A reference numeral 244 denotes an output terminal outputting the detecting signal 130. Other structural elements are the same shown in FIG. 1.

Next, the operation will be described thereof.

The clock signal generating section 210, the voltage detecting circuit 10, the oscillation-stop detecting circuit 30 and the oscillation-stop detection controlling circuit 50 function as they function in the first embodiment. However, in this case, when the oscillation-stop detecting circuit 30 detects stopping of the clock signal 301 and makes the detecting signal 130 high, the internal reset signal 118 having the active low level is applied to the CPU (not shown) through the logical circuit 88. Therefore, the CPU is set in the reset state compulsorily.

As mentioned before, error protection mechanisms of a microcomputer include fail to safe processing by software, a watch-dog timer in the microcomputer, peripheral circuits outside the microcomputer 403 and so forth. Generally, peripheral circuits or the like for preventing errors of the microcomputer are constructed according to a condition when the microcomputer reset. When the clock signal is 301 stops, the error protecting mechanism activated by the microcomputer does not function effectively. However, if the internal reset signal 118 is applied to the CPU when the clock signal 301 stops, the peripheral circuits for error protection function effectively. As a result, the abnormal condition of the microcomputer 403 is detected in the peripheral circuits.

In addition, since the CPU can start again in the reset condition when the clock signal 301 is outputted again, the program functions normally when the clock signal 301 is outputted again. Moreover, in this case, since the detecting signal 130 is outputted to the outside of the microcomputer 403 through the output terminal 244, the peripheral circuits for error protection can easily dectect the abnormal condition of the microcomputer 403.

Furthermore, in this embodiment, although a structure in which the clock signal generating section 210 used in the first embodiment is shown, a stop mode bit from the control register 60 or the clock generating section 211 for using the STOP instruction from the CPU can be utilized as shown in the second embodiment. In addition, the oscillation-stop detection controlling circuit 51 using the first prohibiting signal 116, the second prohibiting signal 117 and the internal reset signal (the third prohibiting signal) 118 can be utilized as shown in the second embodiment.

Embodiment 4

Figure 12:
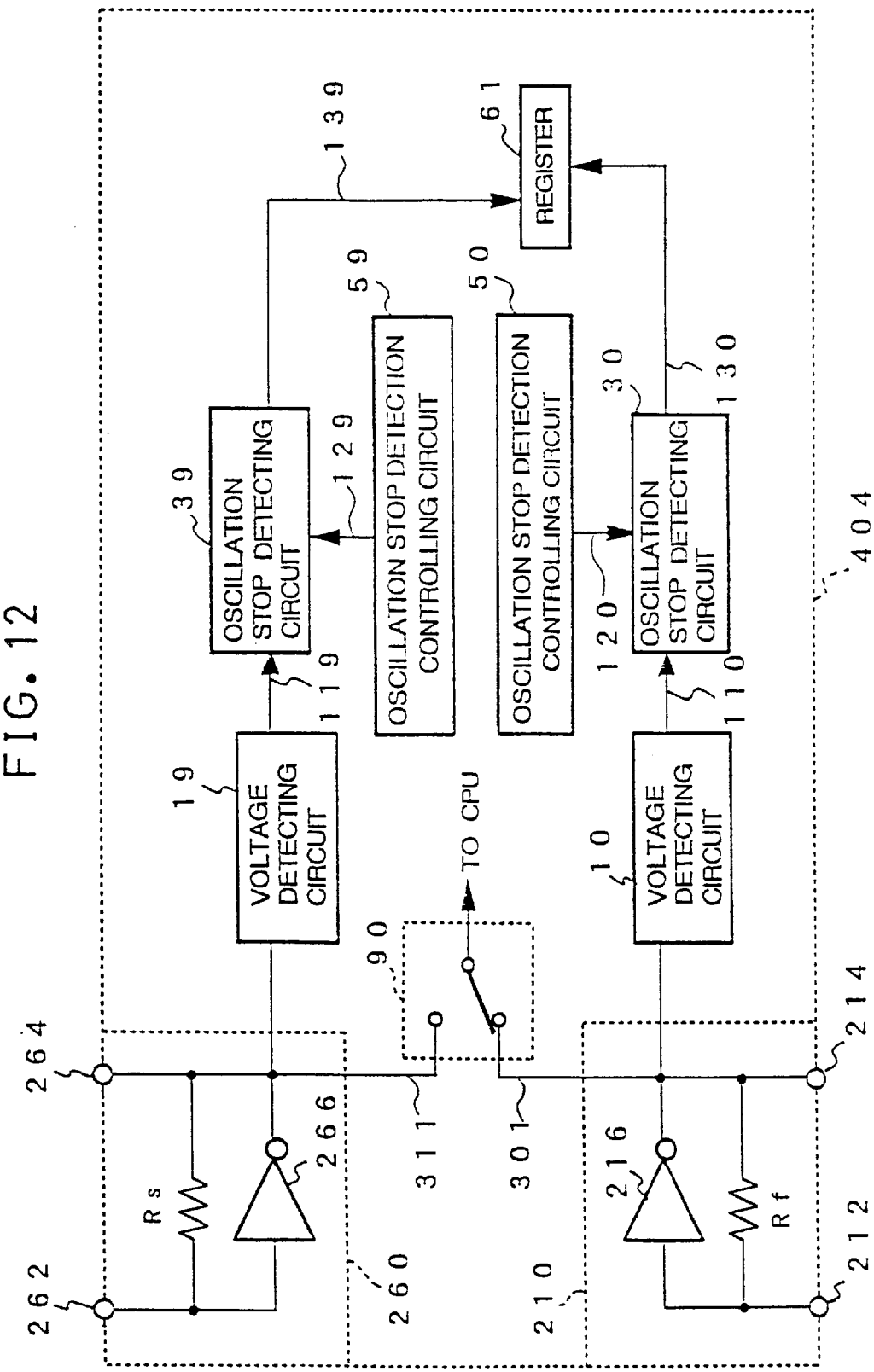
FIG. 12 illustrates a block diagram showing a structure of an oscillation-stop detecting device according to a forth embodiment of the present invention.
Figure 13:
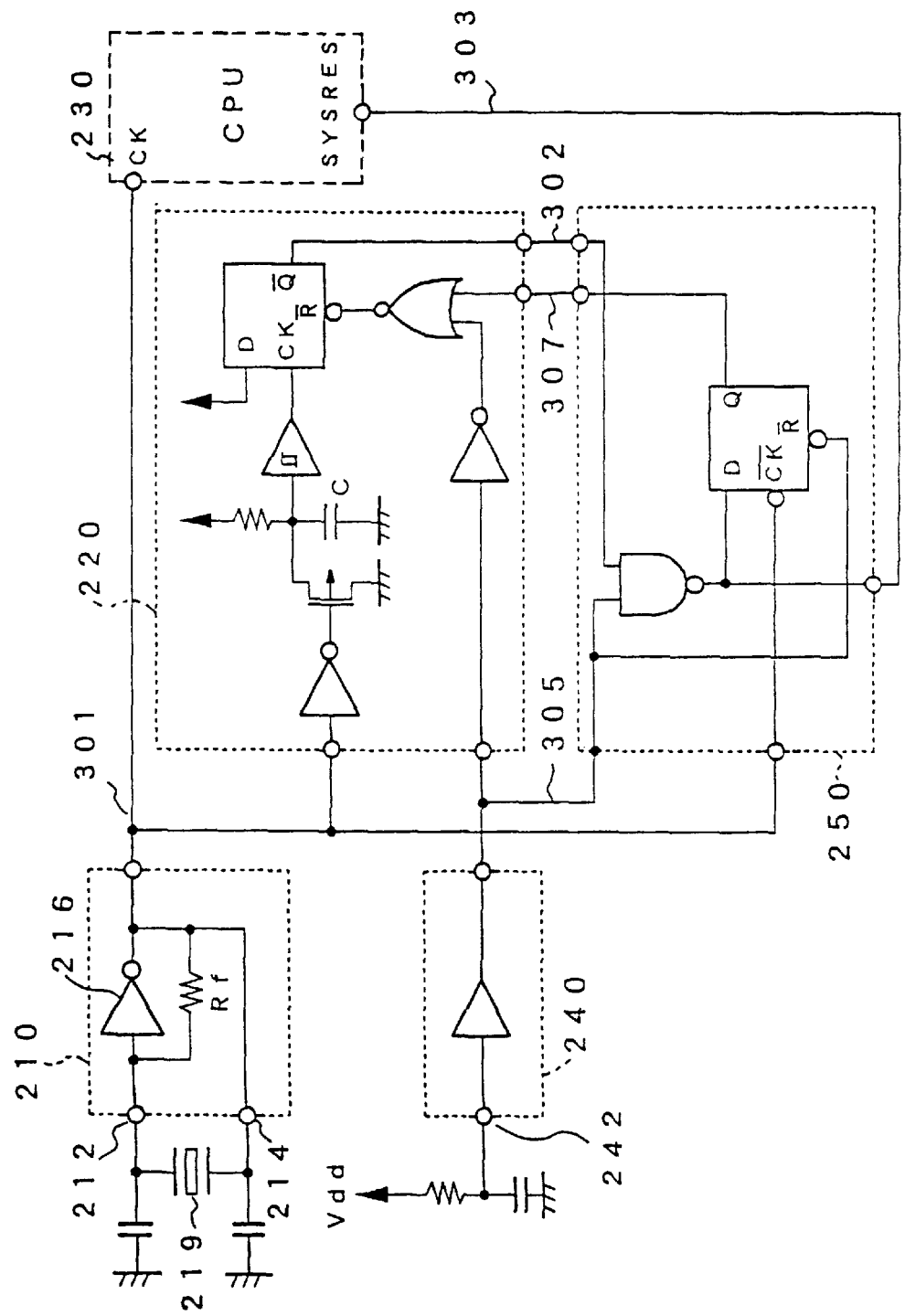
FIG. 13 illustrates a circuit diagram showing a structure of a conventional oscillation-stop detecting device.
Figure 14:
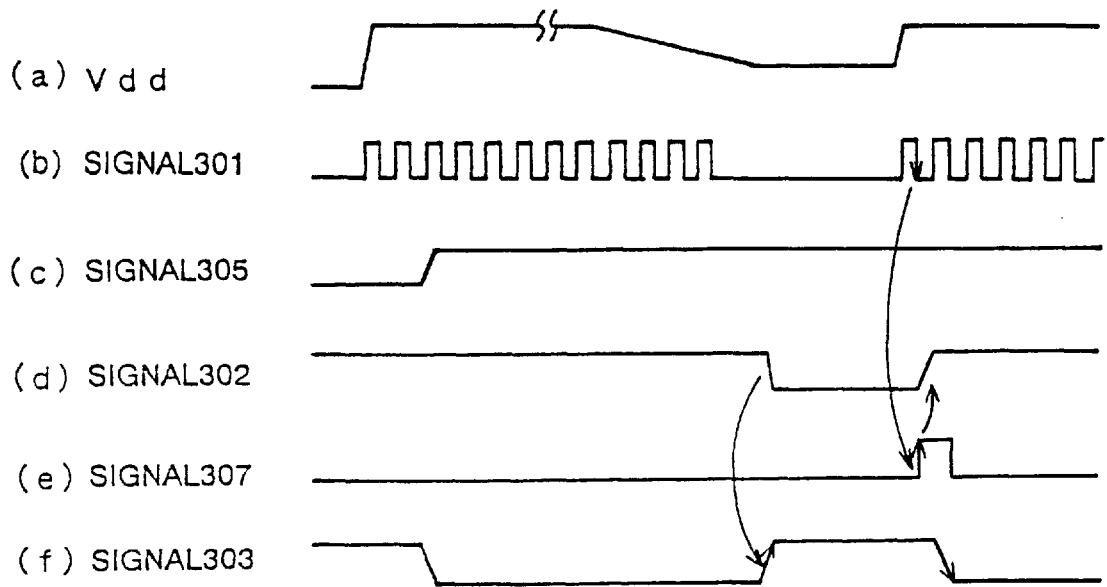
FIG. 14 illustrates a timing chart for showing signals at respective portions in FIG. 13.
Figure 15:
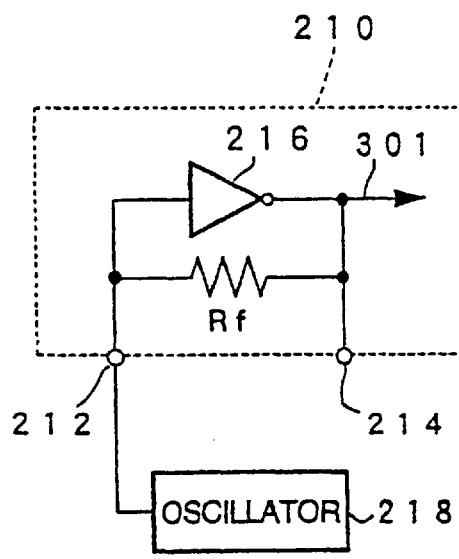
FIG. 15 illustrates a block diagram showing a structure of a clock generating portion.

FIG. 12 illustrates a block diagram showing a structure of an oscillation-stop detecting device according to a forth embodiment of the present invention. Here, an oscillation-stop detecting device is shown as adapted to a microcomputer 404. The microcomputer 404 includes not only the clock signal generating section 210 but also a sub-clock signal generating section. According to such a structure, the microcomputer 404 can use the clock signal 301 from the clock signal generating section 210 and a low speed clock signal 311 from the sub-clock signal generating section with changing in accordance with a speed which is required for processing.

In FIG. 12, a reference numeral 260 denotes a sub-clock generating section having a resistor Rs and an inverter 266 which operates with an oscillator connected to an input terminal 262 and an output terminal 264 to generate a clock signal 311; a reference numeral 19 denotes a voltage detecting circuit detecting a voltage based on the clock signal from sub-clock generating section 260 and generating a voltage detecting signal 119; a reference numeral 39 denotes an oscillation-stop detection controlling circuit detecting stopping of the clock signal 311 using the voltage detecting signal 119 and outputting a detecting signal 139; a reference numeral 59 denotes an oscillation-stop detection controlling circuit for applying an enable signal 129 to the oscillation-stop detecting circuit 39; a reference numeral 61 denotes a register for storing the condition information of the detecting signals 130 and 139, and a reference numeral 90 denotes a switch circuit for selecting one of the clock signal 301 from the clock signal generating section 210 and the clock signal 311 from the sub-clock signal generating section 260. In addition, the voltage detecting circuit 19, the oscillation-stop detecting circuit 39 and the oscillation-stop detection controlling circuit 59 are respectively constructed as same as the voltage detecting circuit 10, the oscillation-stop detecting circuit 30 and the oscillation-stop detection controlling circuit 50.

An operation will be described next.

The clock signal generating section 210, the voltage detecting circuit 10, the oscillation-stop detecting circuit 30 and the oscillation-stop detection controlling circuit 50 function the same as the first embodiment. The sub-clock generating circuit 260, the voltage detecting circuit 19, the oscillation-stop detecting circuit 39 and the oscillation-stop detection controlling circuit 59 function respectively as the clock signal generating circuit 210, the voltage detecting circuit 10, the oscillation-stop detecting circuit 30 and the oscillation-stop detection controlling circuit 50 function. The switch circuit 90 selects one of the clock signal 301 and the clock signal 311 by a control of the CPU (not shown). The microcomputer 404 operates on the basis of a selected clock signal.

The detecting signal 130 from the oscillation-stop detecting circuit 30 and the detecting signal 139 from the oscillation-stop detecting circuit 39 are set in the register 61. Therefore, for instance, when the microcomputer 404 operates on the basis of the clock signal 301, the CPU can recognize whether or not the clock signal 311 from the sub-clock signal generating circuit 260 stops, by confirming an applicable bit of the register 61. In addition, when the microcomputer 404 operates on the basis of the clock signal 311, the CPU can recognize whether or not the clock signal 301 from the sub-clock signal generating circuit 210 stops, by confirming an applicable bit of the register 61.

If the CPU recognizes the stopping of the clock signal 311 when the microcomputer 404 operates on the basis of the clock signal 301, the CPU can execute an error protection mechanism. In other words, an error protection mechanism can be performed by software. For example, processes can be performed that the switch circuit 90 is not changed since then, and that a signal showing the stop of the clock signal 311 is outputted to an output port. Also when the microcomputer 404 operates on the basis of the clock signal 311, the error protection mechanism can be performed by software.

Furthermore, in this embodiment, although a structure in which the clock signal generating section 210 used in the first embodiment is shown, a stop mode bit from the control register 60 or the clock generating section 211 for using the STOP instruction from the CPU can be utilized as shown in the second embodiment. In addition, the oscillation-stop detection controlling circuit 51 using the first prohibiting signal 116, the second prohibiting signal 117 and the internal reset signal (the third prohibiting signal) 118 can be utilized as shown in the second embodiment. Furthermore, the sub-clock signal generating section 260 and the oscillation-stop detection controlling circuit 59 can respectively be constructed as the clock signal generating section 211 and the oscillation-stop detection controlling circuit 51 which are shown in the second embodiment.

If such a structure is formed, when the outputs of clock signals 301 and 311 are outputted again after being stopped, and the reset condition of the CPU is released, the CPU can recognize that the clock signal 301 or the clock signal 311 is stopped once, by confirming the contents of the register 61.

As mentioned above, according to the present invention, since the oscillation-stop detecting device comprises: a voltage detecting circuit for detecting that an output of the clock signal generating section is converged to one of a high level, a low level and an intermediate level, and for outputting a voltage detecting signal; and an oscillation-stop detecting circuit for outputting a detecting signal which shows that the clock signal stops, there is an effect that stop of the clock signal by a variety of causes can be surely detected.

In case that the oscillation-stop detecting device further includes an oscillation-stop detection controlling circuit for prohibiting an operation of the oscillation-stop detecting circuit, there is an effect that there is prevented that the semiconductor device is detected as a malfunction by mistake when the semiconductor is not abnormal, even if the clock signal stops.

In case that the oscillation-stop detection controlling circuit for prohibiting an operation of the oscillation stop detecting circuit when one of a delayed reset signal applied from an outside to the semiconductor device, a delayed signal corresponding to a clock stop mode for stopping the clock signal and a signal for prohibiting a clock signal stop detecting process is active, there is an effect to prevent detecting a malfunction of the semiconductor device by mistake when the reset signal is outputted or the mode is in condition of clock stop mode such as a low consumption mode. In addition, there is an effect that a clock signal stop detecting process can be prohibited by a software arbitrary.

In case that the oscillation stop detecting device further includes a forced reset circuit for applying a reset signal to an inside of the semiconductor device when the detecting signal from the oscillation stop detecting circuit becomes to be active, there is an effect that a malfunction can be easily detected in the peripheral circuits outside the semiconductor device.

In case that the oscillation stop detecting device further includes a register for storing condition information of a detecting signal which shows that a clock signal from each of the clock signal generating sections stops, there is an effect that stop of the clock signal can be recognized by a software when the oscillation stop detecting device is applied to a microcomputer or the like.

What is claimed is:

1. A device for detecting a plurality of signal levels indicating stopping of a clock signal in a semiconductor device having a clock signal oscillator, the device comprising:

a voltage detecting circuit for outputting a clock voltage detection signal when a clock signal output from a clock signal oscillator remains at a high level, when the clock signal remains at a low level, and when the clock signal remains at an intermediate level; and an oscillation-stop detecting circuit for outputting a stop detection signal, indicating stopping of the clock signal, in response to the clock voltage detection signal.

2. The device according to claim 1, comprising an oscillation-stop detection controlling circuit for producing an output signal for preventing operation of said oscillation-stop detecting circuit.

3. The device according to claim 1, comprising a reset circuit for generating a reset signal for resetting portions of said semiconductor device when the detection signal from said oscillation-stop detecting circuit becomes active.

4. The device according to claim 1, comprising:

a plurality of clock signal oscillators outputting respective clock signals;

a plurality of voltage detecting circuits for outputting respective clock voltage detection signals when the clock signals output from said plurality of clock signal oscillators remain at any of the high level, the low level, and the intermediate level;

a plurality of oscillation-stop detecting circuits for outputting, in response to the clock voltage detection signals, stop detection signals indicating stopping of the clock signals; and a register for storing condition information of the stop detection signals, the condition information indicating whether the clock signal output from each of said clock signal oscillators has stopped.

5. The device according to claim 2, comprising a reset circuit for generating a reset signal for resetting portions of said semiconductor device when the detection signal from said oscillation-stop detecting circuit becomes active.

6. The device according to claim 2, comprising:

a plurality of clock signal oscillators outputting respective clock signals;

a plurality of voltage detecting circuits for outputting respective clock voltage detection signals when the clock signals output from said plurality of clock signal oscillators remain at any of the high level, the low level, and the intermediate level;

a plurality of oscillation-stop detecting circuits for outputting, in response to the clock voltage detection signals, stop detection signals indicating stopping of the clock signals; and a register for storing condition information of the stop detection signals, the condition information indicating whether the clock signal output from each of said clock signal oscillators has stopped.

7. The device according to claim 3, comprising:

a plurality of clock signal oscillators outputting respective clock signals;

a plurality of voltage detecting circuits for outputting respective clock voltage detection signals when the clock signals output from said plurality of clock signal oscillators remain at any of the high level, the low level, and the intermediate level;

a plurality of oscillation-stop detecting circuits for outputting, in response to the clock voltage detection signals, stop detection signals indicating stopping of the clock signals; and a register for storing condition information of the stop detection signals, the condition information indicating whether the clock signal output from each of said clock signal oscillators has stopped.

8. The device according to claim 2, wherein said oscillation-stop detection controlling circuit blocks operation of said oscillation-stop detecting circuit in response to one of:

(i) a delayed signal generated by delaying a reset signal for resetting said semiconductor device, (ii) a signal generated by delaying a signal corresponding to a clock stop mode for stopping the clock signal, and (iii) an active state of a signal for preventing operation of a clock signal-stop detecting function.

9. The device according to claim 8, comprising a reset circuit for generating a reset signal for resetting portions of said semiconductor device when the detection signal from said oscillation-stop detecting circuit becomes active.

10. The device according to claim 8, comprising:

a plurality of clock signal oscillators outputting respective clock signals;

a plurality of voltage detecting circuits for respective outputting clock voltage detection signals when the clock signals output from said plurality of clock signal oscillators remain at any of the high level, the low level, and the intermediate level;

a plurality of oscillation-stop detecting circuits for outputting, in response to the clock voltage detection signals, stop detection signals indicating stopping of the clock signals in response to the clock voltage detection signals; and a register for storing condition information of the stop detection signals, the condition information indicating whether the clock signal output from each of said clock signal oscillators has stopped.

11. The device according to claim 9, comprising:

a plurality of clock signal oscillators outputting respective clock signals;

a plurality of voltage detecting circuits for respective outputting clock voltage detection signals when the clock signals output from said plurality of clock signal oscillators remain at any of the high level, the low level, and the intermediate level;

a plurality of oscillation-stop detecting circuits for outputting, in response to the clock voltage detection signals, stop detection signals indicating stopping of the clock signals in response to the clock voltage detection signals; and a register for storing condition information of the stop detection signals, the condition information indicating whether the clock signal output from each of said clock signal oscillators has stopped.

12. The device according to claim 1, wherein the voltage detecting circuit comprises:

a first stop detecting circuit for producing a first stop detecting signal when the clock signal output from said clock signal oscillator remains at the high level;

a second stop detecting circuit for producing a second stop detecting signal when the clock signal output from said clock signal oscillator remains at the low level;

a third stop detecting circuit for producing a third stop detecting signal when the clock signal output from said clock signal oscillator remains at the intermediate level; and a logic circuit for producing the clock voltage detection signal in response to at least one of the first, second, and third stop detecting signals.

13. The device according to claim 2, wherein the oscillation-stop detecting circuit comprises:

a first transistor for receiving the clock voltage detection signal;

a second transistor for receiving the output signal from the oscillation-stop detection controlling circuit; and a capacitor coupled to said first and second transistors, wherein said first and second transistors repeatedly charge and discharge said capacitor when the output signal from said oscillation-stop detection controlling circuit is active and the clock signal is operating, and said first and second transistors discharge said capacitor to produce the stop detection signal when the output signal from said oscillation-stop detection controlling circuit is active and the clock signal is not operating.

* * * * *